3,174,789
SUCTION PICK-UP APPARATUS FOR AUTOMATICALLY HANDLING ARTICLES OF VARIOUS SHAPES
Robert E. Scherr, Old Greenwich, Conn., assignor, by mesne assignments, to AEL Food Automation Division, Inc., Stamford, Conn.
Filed Aug. 7, 1962, Ser. No. 215,396
8 Claims. (Cl. 294—64)

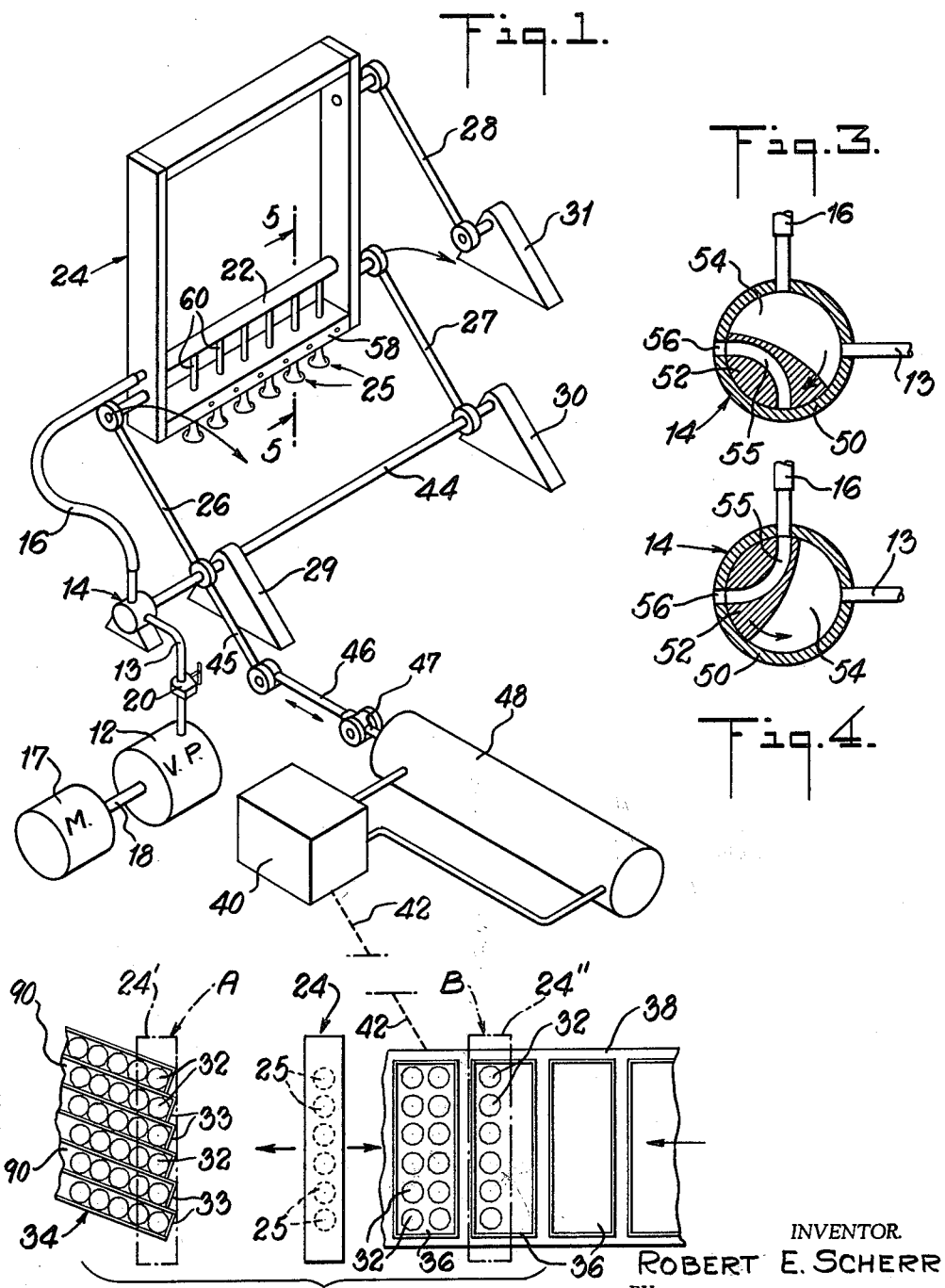

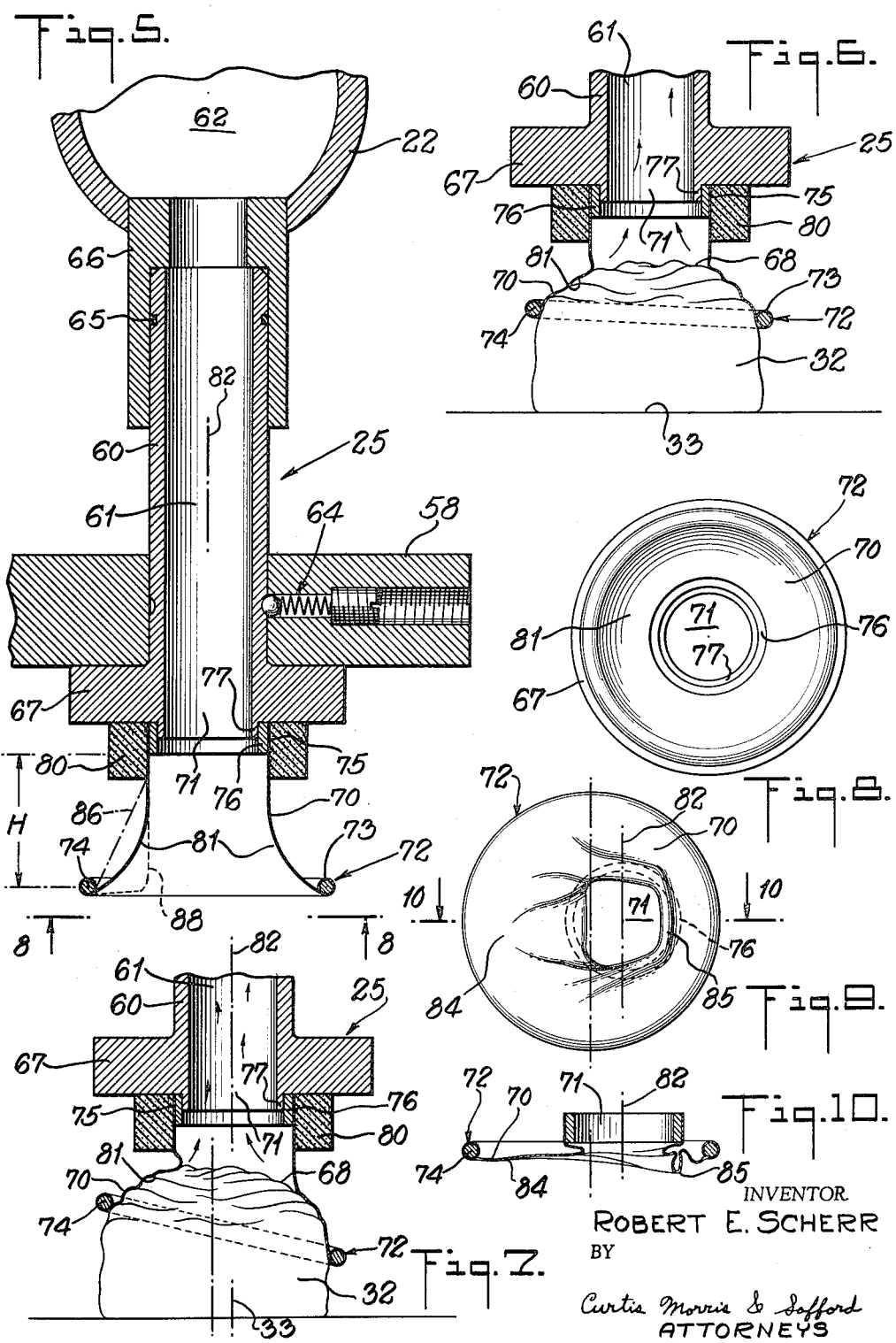

The present invention relates to suction pickup apparatus for automatically handling articles of various and irregular shapes and sizes. Suction pick-up apparatus embodying the present invention is particularly well adapted for automatically lifting and handling irregularly shaped confectionary articles such as chocolate candies, cookies, bonbons, and sweetmeats for gently placing the confections in suitable packages, boxes and containers.

There are suction pick-up devices which have been known prior to the present invention for lifting regular, smooth articles having hard surfaces such as eggs. In picking up these regular, smooth articles by means of a suction device, a sufficiently air-tight seal is readily made between the suction device and the smooth, hard surface of the egg or similar object. It is important to obtain a substantially air tight seal so as to maintain the suction lifting effect, for otherwise, the suction is lost and the article is released. The smooth, regular, hard surface of an egg lends itself readily to the formation of such an operating seal as shown in the prior art, and the hard surface prevents the egg from being marred.

However, in attempting to lift a confectionary article such as a chocolate candy, cookie, bonbon or sweetmeat, there is an extremely difficult problem of preventing unduly large amounts of air leakage between the confection and the suction apparatus while at the same time avoiding any damaging, crushing, or marring of the confection. The surfaces of confections are soft and delicate; many have soft chocolate or creamy fondant coatings; they are sometimes crumbly; and they usually include irregular contours, flutes, swirls, and similar decorative patterns which are easily damaged or marred so as to be unacceptable to the consumer.

When attempts are made to lift such confections by means of the suction pick-up devices of the prior art, it is found that the decorative patterns create numerous leakage channels adjacent to the surface of the confection through which the suction is lost. If a larger suction capacity is used in an effort to maintain the suction in spite of this leakage, then the soft, delicate surface of the confection is damaged or marred by the excessive forces resulting from the large differential in pressure between the atmosphere surrounding the lower portion of the confection and the lower pressure in the interior of the suction device engaging the top portion of the confection. In the case of liquid-center chocolates this large pressure differential often ruptures the soft chocolate shells and sucks the liquid core out from the candies.

Among the many advantages provided by the suction pick-up apparatus described herein as illustrative of the present invention are those resulting from the fact that the apparatus is capable of gently picking-up irregular, soft, delicate confections and automatically transporting them into suitable packages, boxes, containers and similar receptacles without marring or damaging the decorative patterns on the confections. Moreover, this apparatus provides a substantially air-tight seal against the surface of the confection and enables the various confections to be lifted and supported with only a moderate pressure differential. This apparatus embodying the present invention has proved to be extremely effective and dependable for the purpose of gently lifting, transporting and depositing such confectionary articles. This apparatus embodying the invention accommodates itself to variations in shapes and sizes of the confections. The apparatus accommodates variations in lateral placement or height of the confections without crushing them or marring them during operation. The apparatus can be operated repetitively many thousands of times and can be depended upon to handle the confectionary articles in repetitive cycles many thousands of times without dropping or damaging the confections.

It is an object of the present invention to provide suction pick-up apparatus for automatically handling confectionary articles in a dependable, effective manner while maintaining the confections in high quality form acceptable to the consumers.

The various aspects, advantages and further objects of the present invention are set forth in the following description of an illustrative embodiment of the invention in suction pick-up apparatus for automatically handling confectionary articles of various shapes, which is to be read with reference to the accompanying drawings, wherein:

FIGURE 1 is a perspective view of suction pick-up apparatus embodying the present invention;

FIGURE 2 is a plan view illustrating the operation of the apparatus in transporting the confections from a supply source into suitable packages;

FIGURES 3 and 4 are sectional views of valve mechanism for controlling the suction action;

FIGURE 5 is a partial sectional view taken along the lines 5—5 of FIGURE 1 and shown on enlarged scale;

FIGURE 6 corresponds with a portion of FIGURE 5 and shows the operation of the pick-up apparatus in engaging a confectionary article;

FIGURE 7 corresponds with FIGURE 6 and shows the successful engagement of the pick-up apparatus with a confectionary article regardless of the fact that the confection is displaced laterally from its intended position;

FIGURES 8, 9 and 10 illustrate the advantageous operation of the flexible skirt portion of the pick-up apparatus in resisting collapsing or choking off of the suction action.

As shown in FIGURE 1, the suction pick-up apparatus for automatically handling confectionary articles includes a suitable source of moderate vacuum shown as a vacuum pump 12 connected through a vacuum line 13 and a control valve 14 to a flexible suction hose 16. An electric motor 17 drives the shaft 18 of the vacuum pump, for example, of a positive displacement type, and the suction is controlled by means of a manually adjustable air-bleed valve 20 in the line 13. This air-bleed valve 20 is of a pressure-relief type and is normally closed. As explained in further detail below, the seal-off action of this apparatus in engaging the confections is so effective that only a relatively small amount of suction is required to lift them. For example, a suction of no more than 5 inches of mercury is sufficient to lift many types of assorted cholocate candies, but during normal operation a somewhat greater amount of suction is used. For handling delicate confections, for example such as chocolate-cordial cherries having liquid cores, the valve 20 is set to open whenever the suction in line 13 exceeds a differential with respect to atmospheric pressure greater than 7½ inches of mercury. When this valve 20 opens it admits air from the atmosphere into the suction line 13 thus limiting the effective suction provided by the hose 16 to the desired level of 7½ inches of mercury.

For handling less delicate types of confections a greater suction can be used if desired; however the limit of 7½ inches of mercury is very satisfactory for the application as illustrated in the drawings.

This flexible hose 16 is connected to a conduit 22 which is supported in a movable frame 24 and forms a manifold for supplying the desired moderate suction to a plurality of suction pick-up units 25. The movable frame 24 is supported by a plurality of swing arms 26, 27 and 28 having respective fixed bearing mounts 29, 30 and 31, so that the frame 24 can be moved cyclically back and forth between a first position A (FIGURE 2) and a second position B.

In this example of the invention the box 36 is designed to hold a dozen chocolate candies having liquid-filled centers and arranged in two parallel rows in the box. The box is moved into position for receiving the confections 32 by conveyor means 38 shown as a conveyor belt having a sequence of the boxes supported and uniformly spaced thereon.

The pick-up frame 24 is indicated in the loading position B by the dash and dot outline 24″ where it is shown placing the first row of six confections 32 into the box 36. Before the completion of the next movement of the pick-up frame over into position B, the conveyor means 38 advances the box 36 so that it receives the second row of confections 32 adjacent to those already loaded into the box. Then the conveyor means 38 successively advances the next box 36 into the loading position B for receiving its first and second row of confections therein, and so forth. The conveyor means 38 is positively controlled in its motion by suitable control mechanism schematically indicated in block form at 40, as will be understood by those skilled in the art, and having a control connection 42 with the conveyor means.

The swing arms 27 and 28 are arranged to provide a parallelogram linkage so that the frame 24 is held in its upright position as it is moved back and forth. The arms 26 and 27 and a crank arm 45 are secured to a rotatable rod 44, and a connecting rod 46 and piston rod 47 extending from a cylinder 48 drive the pick-up frame 24 between positions A and B. The central control mechanism 40 operates the driving means 48 for the pick-up frame 24 in timed relationships with the conveyor means 38.

As shown in FIGURES 3 and 4, the control valve 14 has an outer stationary sleeve 50 and an inner rotatable valve member 52 which is connected to and rotates with the rotatable shaft 44. Thus, suction is provided in the manifold 22 when the pick-up units 25 are in position A, and the effective connection to the source 12 is maintained by the cut-out portion 54 of the valve member 52, as shown in FIGURE 3, until just before the units 25 have reached the position B. When the pick-up units are in the position B, the suction is released, as shown in FIGURE 4, by a passage 55 of the valve member 52 which connects the hose 16 to an atmospheric inlet port 56.

Extending across the lower part of the frame 24 is a bar 58 for supporting a plurality of suction pick-up units 25, one of which is illustrated in detail in FIGURE 5. Each unit 25 includes a hollow member 60 with a cavity 61 therein communicating with the suction passage 62 in the manifold 22. These units 25 are removably held in the support bar 58 by resilient detent means 64, for example such as a spring-biased ball detent. An air-tight connection with the manifold 22 is made by a rubber gasket 65, such as an O ring, in an annular recess in the upper end of the member 60 and fitting into a connection socket 66 on the manifold. Thus, it is very easy to remove and quickly replace any of the units 25 if desired, and a knurled flange 67 is provided as a grip for holding to remove the unit.

In order to provide a dependable effective seal with the soft irregularly contoured surface 68 of the confection 32, the suction unit has a very flexible, pliant, flared skirt 70 of limp, pliable, self-draping membrane-like material, for example such as very thin rubber sheeting of the type used in toy balloons. This skirt 70 surrounds the mouth 71 of the hollow member 60 and depends therefrom with a stiff rim 72 spaced from the mouth to provide a large available sealing area of the sheet 70 while preventing the collapse of the pliant sheet 70 over the open mouth 71. In this example the stiff rim 72 is provided on the lower perimeter of the skirt 70 in the form of a convex geometric shape as seen in plan view in FIGURE 8. In this example, the rim 72 is shown as having a circular configuration, which is the most effective configuration for lifting many types of confections; however, other convex geometric shapes such as triangular, square, rectangular, pentagonal, hexagonal and so forth can also be used to advantage in certain applications for handling particular confections. The skirt shape as shown has been found to have the ability to handle confections of many different sizes and shapes. A preferred way in which to form the rim 72 is to form the lower edge 73 of the thin, pliant, flexible material out and around a stiff rim element having the desired geometric shape, shown illustratively as a round steel ring. The edge 73 may be cemented to the ring, or the edge 73 of the sheet material may be moulded about the stiff rim element.

The upper edge 75 of this skirt 70 is secured by cement to a mounting element, shown as a cylindrical ring 76, which is fastened to a lip 77 surrounding the mouth 71. A soft annular pad 80 of spongy yielding resilient material, for example sponge rubber, is attached to the lower end of the pick-up nozzle unit 25 and surrounds the upper portion of the skirt 70.

The skirt 70 is very pliant and flexible and is self-draping so that it droops down into intimate contact with the irregularly contoured surface 68 of the confection 32, as shown in FIGURE 6, when the suction units 25 are lowered down into the pick-up position A. Regardless of irregularities in the surface 68 of the confection 32, the large available area of this pliant, self-draping skirt 70 does conform to and cling to this surface 68 so as to make an effective seal therewith having very little leakage. In order to provide the engulfing clinging action as shown in FIGURE 6, the skirt 70 must be very pliant, flexible and self-draping. In this example of the skirt 70 is formed of thin sheet neoprene having a thickness in the range from 0.004 of an inch to 0.015 of an inch, and a thickness of 0.008 of an inch is found to work to great advantage with many kinds of confections. A thickness of 0.020 of an inch was found to produce a skirt which is somewhat too stiff for the desired engulfing clinging action, and hence too much leakage occurred for satisfactory operation. The lower limit of thickness is dictated by durability. When the skirt is too thin it lacks the desired durability for many thousands of cycles of operation.

Advantageously, the pliant, self-draping skirt 70 accommodates variations in height and shape of the confections without crushing or marring them. As soon as the skirt has engulfed and clung to the confection 32, the suction action lifts the confection away from the supporting region 33 (FIGS. 2 and 7) of the supply source. Thus, advantageously, a greater area of the skirt comes into sealing engagement with the confection, increasing the sealing action, until the outer surface of the skirt bumps up against the soft pad 80.

As illustrated in FIGURE 7, the apparatus accommodates lateral misalignment of the confection with respect to the axis 82 of the pick-up unit 25. For example, the confection 32 may not be centered upon the desired pick-up point 33, but nevertheless this apparatus advantageously accommodates itself to such laterally offset relationship of the confection.

It is to be noted that the sealing action is provided by the intermediate area 81 of the skirt 70 between the stiff element 72 and the mouth 71. It is this extensive intermediate area which droops down into clinging, engulfing relationship with the surface of the confection. Neoprene is used when handling chocolates because it is less affected by the butter fat content than rubber, but it will be understood that other sheet and film materials having the desired characteristics as specified above may be utilized for the skirt 70.

FIGURES 8, 9 and 10 show the critical relationship of the stiff outer rim element 72 with respect to the mouth 71 and the mounting elements 76 and 77 so as to prevent the very pliant, flexible skirt 70 from collapsing and completely shutting off the suction. As shown in FIGURES 9 and 10, when the rim 72 is shifted off toward one side of the mounting 77 until the area 84 on this side is taut, there is insufficient limp material 85 on the opposite side to cover up fully the mouth 71. It may partially but not fully obstruct the mouth 71. Thus, the suction is never choked off by the skirt 70.

As illustrated by the dash-and-dot line 86 in FIGURE 5, the skirt 70 may be conical and it will operate satisfactorily. However, the bell-like outward curving flare of the skirt as shown in section is preferable as providing a greater extent of intermediate surface 81 available for sealing action.

If the outward flare is too abrupt as indicated by the dotted line 88, i.e., if there is too great a departure from a straight line 86, then the intermediate area of the skirt can be drawn completely across the mouth 71 so as to block it off.

For preventing closure of the mouth 71 while providing highly effective suction pick-up operation a desirable relationship is for the inner diameter of the rim element 72 to be at least 1.6 times the diameter of the mouth 71 and for the height H of the skirt to be at least as large as the diameter of the mouth 71. In this preferred embodiment as shown the rim element 72 has an inner diameter of 1.0 inch and the mouth 0.5 inch and the height H is 1.2 inch.

The confections are supplied to the respective pick-up regions 33, shown as the ends of channels 90 into which the confections are fed from suitable conveyor means, such as a conveyor belt.

From the foregoing, it will be understood that the present invention provides dependable and effective suction pick-up apparatus for handling confectionary articles and the foregoing specification is to be interpreted as illustrative of the invention which is defined by the following claims.

I claim:

1. Suction pick-up apparatus for lifting and holding delicate articles of irregular configuration comprising means for producing suction, a conduit connected to said suction-producing means and having an open mouth, a thin, pliant sheet surrounding said mouth and depending below said mouth for providing an engulfing clinging surface area of said pliant sheet below and surrounding said mouth for sealing against the delicate articles, and a stiffening element secured to and supported by said pliant sheet and spaced from said mouth beyond said engulfing clinging surface area to prevent the collapse of said pliant sheet completely over the open mouth, and said stiffening element being free to shift and to become offset with respect to said mouth for accommodating articles laterally misaligned with respect to said mouth.

2. Suction pick-up apparatus for lifting and holding articles having delicate surfaces of irregular configuration comprising means for providing suction, a conduit adapted to be connected to said suction means, said conduit having an open mouth, a thin, pliant skirt surrounding said mouth and depending below said mouth, said skirt having a generally conical shape with a smaller diameter near said mouth and a larger diameter near its lower portion, and a stiffening element extending along the lower portion of said skirt for preventing the collapse of said skirt completely over said open mouth.

3. Suction pick-up apparatus as claimed in claim 2 and wherein said stiffening element has a convex geometrical shape.

4. Suction pick-up apparatus for lifting and holding confectionary articles of irregular configuration comprising means for providing suction, a hollow member adapted to be removably connected to said means, said hollow member having an open mouth, a thin, pliant sheet surrounding said mouth and depending below said mouth for providing a pliant sealing area of said sheet below and surrounding said mouth, a stiffening element secured to and supported by said sheet and spaced from said mouth to prevent the collapse of said sheet completely over the open mouth, said stiffening element being free to become offset with respect to said mouth for accommodating articles laterally misaligned with respect to said mouth, and a soft pad adjacent to the outside of said sheet near said mouth.

5. Suction pick-up apparatus for lifting and holding confectionary articles having delicate surfaces of irregular configuration comprising a source of suction for providing a pressure below atmospheric, a conduit connected to said source and having an open mouth, a thin, pliant skirt surrounding said mouth and depending below said mouth, a stiffening edge rim extending along the lower edge of said skirt and being spaced from said mouth, said edge rim defining a larger opening than said mouth, and soft pad means positioned about the upper portion of said skirt adjacent to said mouth.

6. Suction pick-up apparatus for lifting and holding chocolate confectionary articles of irregular configuration comprising a source of suction for providing a pressure which is below atmospheric, a hollow member connected to said source, said hollow member having a mouth, a thin, pliant skirt formed of a neoprene membrane having a thickness in the range from 0.004 of an inch to 0.015 of an inch, said skirt surrounding said mouth and depending below said mouth, and a stiffening element of convex geometrical shape defining a larger opening than said mouth, said stiffening element being secured to the lower portion of said skirt to prevent the collapsing of said skirt completely across said open mouth.

7. Suction pick-up apparatus for lifting and transferring articles having delicate surfaces of irregular configuration comprising means for providing suction, a movable conduit connected to said suction means, valve means for controlling the suction in said conduit, said conduit having an open mouth, a thin, pliant skirt surrounding said mouth and depending from and flaring outwardly below said mouth, a stiffening element of convex geometrical configuration extending along the lower portion of said skirt and having a larger diameter than said mouth for preventing the collapse of said skirt completely over said open mouth, and drive means for moving said conduit.

8. In the art of lifting and holding articles by suction, the method of lifting and holding delicate articles having an irregular surface configuration comprising the steps of creating a suction inlet, surrounding said suction inlet with a thin, pliant skirt, holding the lower portion of the skirt outwardly in a flared, bell like configuration to prevent collapsing of the skirt completely over said inlet, bringing said skirt and the irregular surface of the article into adjacent relationship, draping said pliant skirt into clinging relationship with said irregular surface around said inlet for providing an effective sealing and lifting action.

References Cited by the Examiner

UNITED STATES PATENTS

| 1,178,147 | 4/16 | Gardner | 294—64 |
| 2,934,086 | 4/60 | Blatt | 294— 64 X |
| 3,077,993 | 2/63 | Mulvany | 294—64 |
| 3,089,722 | 5/63 | Creskoff | 294—65 |

FOREIGN PATENTS 538,231   1957   Canada.

SAMUEL F. COLEMAN, Primary Examiner.

ANDRES H. NIELSEN, Examiner.